(12) United States Patent
Jiang et al.

(10) Patent No.: US 11,899,875 B2
(45) Date of Patent: Feb. 13, 2024

(54) ELECTRONIC DEVICE AND DISPLAY METHOD THEREOF

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yanni Jiang, Beijing (CN); Guoqiang Wu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/509,671

(22) Filed: Oct. 25, 2021

(65) Prior Publication Data

US 2022/0276759 A1    Sep. 1, 2022

(30) Foreign Application Priority Data

Feb. 24, 2021    (CN) .......................... 202110210187.8

(51) Int. Cl.
*G06F 3/041*    (2006.01)
*G06F 3/14*    (2006.01)

(52) U.S. Cl.
CPC ...... *G06F 3/04166* (2019.05); *G06F 3/04184* (2019.05); *G06F 3/1407* (2013.01)

(58) Field of Classification Search
CPC ............. G06F 3/04166; G06F 3/04184; G06F 3/1407; G06F 3/0488; G09G 2330/021
See application file for complete search history.

(56) References Cited

U.S. PATENT DOCUMENTS

| | | | |
|---|---|---|---|
| 11,514,831 B2 * | 11/2022 | Bae | G09G 3/20 |
| 2017/0308226 A1 * | 10/2017 | Yoo | G06F 1/3293 |
| 2019/0189048 A1 * | 6/2019 | Hong | G09G 5/393 |
| 2019/0286222 A1 * | 9/2019 | An | G06F 9/542 |
| 2020/0233461 A1 * | 7/2020 | Kim | G06F 1/1643 |
| 2021/0116986 A1 * | 4/2021 | Li | G09G 3/20 |
| 2021/0247812 A1 * | 8/2021 | Jin | G06F 1/1686 |
| 2021/0342568 A1 * | 11/2021 | Huang | G06F 3/0487 |
| 2021/0405794 A1 * | 12/2021 | Shepelev | G06F 3/0416 |
| 2022/0269644 A1 * | 8/2022 | Zhou | G06F 1/3265 |

* cited by examiner

*Primary Examiner* — Bryan Earles
(74) *Attorney, Agent, or Firm* — DINSMORE & SHOHL LLP

(57) ABSTRACT

An embodiment of the present disclosure provides an electronic device and a display method thereof. The electronic device comprises: a touch processor and a display driver. The touch processor is configured to generate touch information. The display driver is coupled to the touch processor and configured to: receive the touch information sent by the touch processor; send first indication information to the touch processor when the electronic device is in a first operation mode, the first indication information indicating that image data to be displayed is determined by the display driver; determine first image data according to the first operation mode and the touch information; and drive a display screen to display according to the first image data.

11 Claims, 8 Drawing Sheets

ELECTRONIC DEVICE AND DISPLAY METHOD THEREOF

CROSS-REFERENCE TO RELATED APPLICATIONS

This application claims the priority to the Chinese patent application 202110210187.8 filed on Feb. 24, 2021, the contents of which are incorporated herein by reference in their entirety for all purposes.

TECHNICAL FIELD

The present disclosure relates to an electronic device and a display method thereof.

BACKGROUND

With the popularization of electronic devices such as smart phones and tablet computers and the continuous development of electronic technology, multifunctional screen applications bring a stronger sense of user experience to an electronic product. The multifunctional screen applications comprise an always-on-display function, a screen-off unlocking function, etc.

At present, the multifunctional screen applications mainly process information to be displayed in a screen-off state through an application processor (AP), and send image data formed after the processing to a display driver integrated circuit (DDIC), so that the DDIC drives the display screen to display.

SUMMARY

Embodiments of the present disclosure provides an electronic device and a display method thereof.

In one aspect, there is provided an electronic device, which comprises a touch processor and a display driver. The touch processor is configured to generate touch information; and the display driver is coupled to the touch processor and configured to: receive the touch information sent by the touch processor, receive the touch information sent by the touch processor; send first indication information to the touch processor when the electronic device is in a first operation mode, the first indication information indicating that image data to be displayed is determined by the display driver; and determine first image data according to the first operation mode and the touch information, and drive a display screen to display according to the first image data.

In an example, the touch processor comprises a first serial peripheral interface (SPI) interface, and the display driver comprises a second SPI interface, the second SPI interface being coupled to the first SPI interface.

In an example, the display driver comprises: an internal memory configured to store image data of at least one image; and a first processor configured to: receive the touch information sent by the touch processor; send the first indication information to the touch processor when the electronic device is in the first operation mode; and according to the first operation mode and the touch information, select image data of an image from the internal memory as first image data.

In an example, the display driver comprises: an internal memory configured to store image data of at least one image; and a first processor, the first processor being configured to: receive the touch information sent by the touch processor; send the first indication information to the touch processor when the electronic device is in the first operation mode; and according to the first operation mode and the touch information, select image data of an image from the internal memory and correct the selected image data by using correction data, to obtain first image data.

In an example, the electronic device further comprises a second processor; wherein: the display driver is further configured to send second indication information to the touch processor when the electronic device is in a second operation mode, the second indication information indicating that image data to be displayed is determined by the second processor; the touch processor is further configured to send the touch information to the second processor in response to the second indication information; the second processor is configured to determine second image data according to the second operation mode and the touch information and send the second image data to the display driver; and the display driver is further configured to drive the display screen to display according to the second image data.

In an example, the touch processor comprises a switching circuit configured to send third indication information to the second processor in response to the second indication information, the third indication information indicating that image data to be displayed is determined by the second processor; and the second processor is configured to determine second image data according to the second operation mode and the touch information in response to the third indication information.

In an example, the touch processor comprises a first SPI interface, the display driver comprises a second SPI interface, and the second processor comprises a third SPI interface; and both the second SPI interface and the third SPI interface are coupled to the first SPI interface.

In an example, the touch information includes fingerprint information or gesture operation information.

In one aspect, there is provided a display method of an electronic device, wherein the electronic device comprises a touch processor and a display driver coupled to each other, and the display method of the electronic device comprises: the touch processor generating touch information and sending the touch information to the display driver; the display driver receiving the touch information and sending first indication information to the touch processor when the electronic device is in a first operation mode, the first indication information indicating that image data to be displayed is determined by the display driver; and the display driver determining first image data according to the first operation mode and the touch information, and driving a display screen to display according to the first image data.

In an example, the display driver has image data of at least one image stored therein; and the display driver determining first image data according to the first operation mode and the touch information comprises: according to the first operation mode and the touch information, selecting image data of an image from the stored image data as the first image data, or selecting image data of an image from the stored image data and correcting the selected image data by using correction data, to obtain the first image data.

In an example, the display driver has image data of at least one image stored therein; and the display driver determining first image data according to the first operation mode and the touch information comprises: according to the first operation mode and the touch information, selecting image data of an image from the stored image data and correcting the selected image data by using correction data, to obtain the first image data.

In an example, the electronic device further comprises a second processor, and the display method of the electronic device further comprises: the display driver sending second indication information to the touch processor when the electronic device is in a second operation mode, the second indication information indicating that image data to be displayed is determined by the second processor; the touch processor sending the touch information to the second processor in response to the second indication information; the second processor determining second image data according to the second operation mode and the touch information and sending the second image data to the display driver; and the display driver driving the display screen to display according to the second image data.

In an example, the display method of the electronic device further comprises: the touch processor sending third indication information to the second processor in response to the second indication information, the third indication information indicating that image data to be displayed is determined by the second processor; and the second processor determining second image data according to the second operation mode and the touch information comprises: the second processor determining the second image data according to the second operation mode and the touch information in response to the third indication information.

BRIEF DESCRIPTION OF THE DRAWINGS

In order to more clearly illustrate the technical solutions of the embodiments of the present disclosure, the drawings used in the description of the embodiments or the prior art will be briefly described below. It is obvious that the drawings in the following description are only some embodiments of the present disclosure, and other drawings can be obtained by those of ordinary skill in the art according to these drawings without making inventive efforts.

DETAILED DESCRIPTION

Figure 1A:
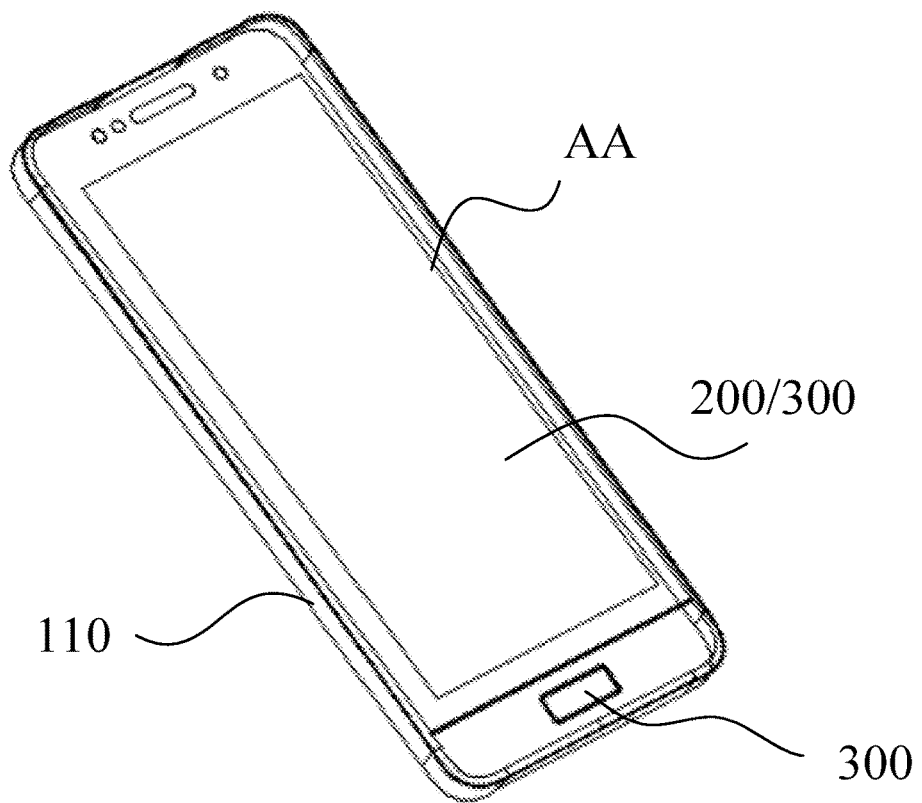
FIG. 1A is a structural diagram of an electronic device according to some embodiments of the present disclosure.

The technical solutions in the embodiments of the present disclosure will be described clearly and completely with reference to the drawings in the embodiments of the present disclosure, and it is obvious that the embodiments described are only some of the embodiments of the present disclosure, rather than all of them. All other embodiments, which can be derived by those of ordinary skill in the art from the embodiments disclosed herein without making inventive efforts, are intended to be within the scope of the present disclosure.

Unless otherwise required by the context, throughout the specification and claims, a term "comprise" and its other forms such as the third person singular "comprises" and the present participle "comprising", will be interpreted as open-minded and inclusive, i.e., "including, but not limited to". In the description of the specification, terms "one embodiment", "some embodiments", "exemplary embodiments", "example", "specific example", or "some examples", etc., are intended to indicate that a specific feature, structure, material, or characteristic relevant to the embodiment or example is included in at least one embodiment or example of the present disclosure. Schematic representations of the above terms do not necessarily refer to a same embodiment or example. Furthermore, the specific feature, structure, material, or characteristic can be included in any suitable manner in any one or more embodiments or examples.

Hereinafter, terms "first", "second" are used for descriptive purposes only and are not to be understood as indicating or implying relative importance or implicitly indicating the number of a technical feature indicated. Thus, a feature defined with "first" or "second" can explicitly or implicitly include one or more of the feature. In the description of the embodiments of the present disclosure, "a plurality" means two or more unless otherwise specified.

In describing some embodiments, expressions "coupled" and "connected", as well as their derivatives, may be used. For example, the term "connected" may be used in describing some embodiments to indicate that two or more components are in direct physical or electrical contact with each other. As another example, in describing some embodiments, the term "coupled" may be used to indicate that two or more components are in direct physical or electrical contact. However, the terms "coupled" or "communicatively coupled" may also mean that two or more components are not in direct contact with each other, but yet still cooperate or interact with each other. The embodiments disclosed herein are not necessarily limited to the contents herein.

The use of "adapted to" or "configured to" herein means to be open-minded and inclusive, which does not preclude devices applied to or configured to perform additional tasks or steps.

In addition, the use of "based on" or "according to" means to be open-minded and inclusive in that a process, step, calculation, or other action that is "based on" or "according to" one or more stated conditions or values can, in practice, be based on additional conditions or exceed the stated values.

Exemplary embodiments are described herein with reference to cross-sectional and/or plan views as idealized exemplary drawings. In the drawings, the thickness of layers and areas are enlarged for clarity. Therefore, shape variations relative to the drawings caused by, for example, manufacturing techniques and/or tolerances, are to be expected. Thus, the exemplary embodiments should not be construed as limited to shapes of the areas illustrated herein, but include shape deviations due to, for example, manufacturing. For example, an etched area shown as a rectangle will typically have a curved feature. Thus, the areas illustrated in the drawings are schematic in nature and their shapes are not intended to illustrate actual shapes of areas of a device and are not intended to limit the scope of the exemplary embodiments.

As described above, a multifunctional screen application mainly processes information to be displayed in a screen-off state through an application processor (AP), and sends image data formed after the processing to a display driver integrated circuit (DDIC), so that the DDIC drives a display screen to display. However, this process undoubtedly increases power consumption of the AP, and the increase in the power consumption may cause a series of problems such as heat generation and faster power consumption of an electronic device.

Embodiments of the present disclosure provide an electronic device and a display method thereof to solve a problem of how to reduce power consumption of a processor in an electronic device.

Embodiments of the present disclosure provide an electronic device, which can be a device such as a computer, a mobile phone, a digital camera, a facsimile machine, an all-in-one machine, etc., which is composed of electronic components such as an integrated circuit, a transistor, an electronic tube, etc., and works by applying electronic technology (software). The present disclosure is mainly directed to an electronic device having a display function, which can be, for example, a television set, a billboard, a digital photo frame, a laser printer having a display function, a telephone, a mobile phone, a personal digital assistant (PDA), a digital camera, a camcorder, a viewfinder, a monitor, a navigator, a vehicle, a large-area wall, a home appliance, an information inquiry device (e.g., a business inquiry device of a department such as e-government, a bank, a hospital, and electric power, etc.).

Figure 1B:
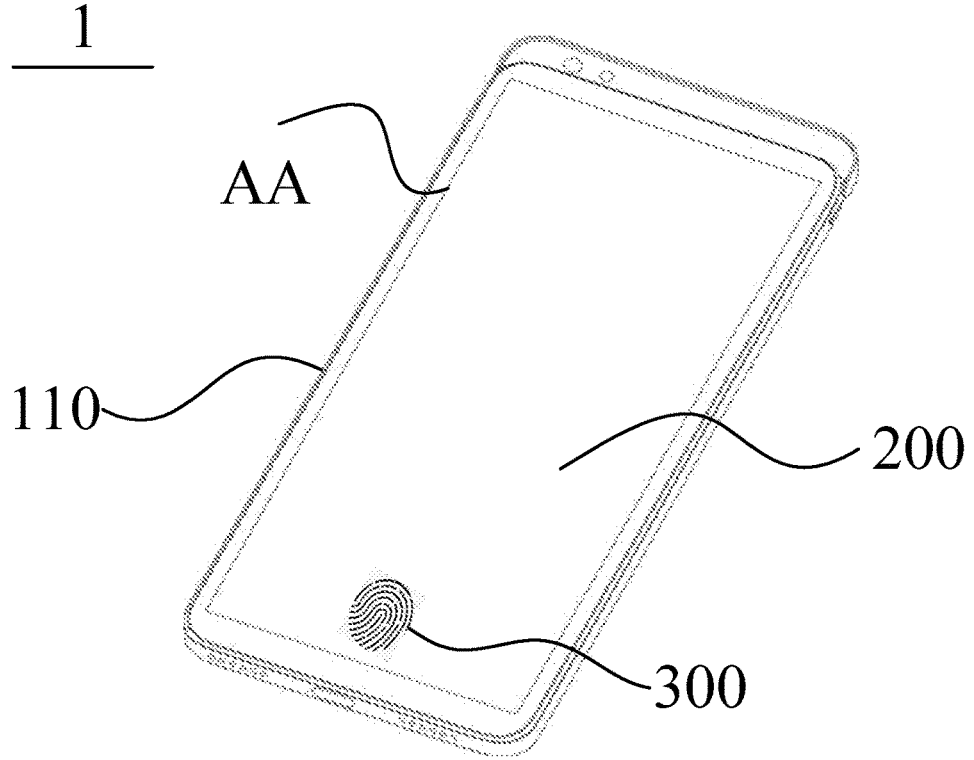
FIG. 1B is a structural diagram of another electronic device according to some embodiments of the present disclosure.
Figure 1C:
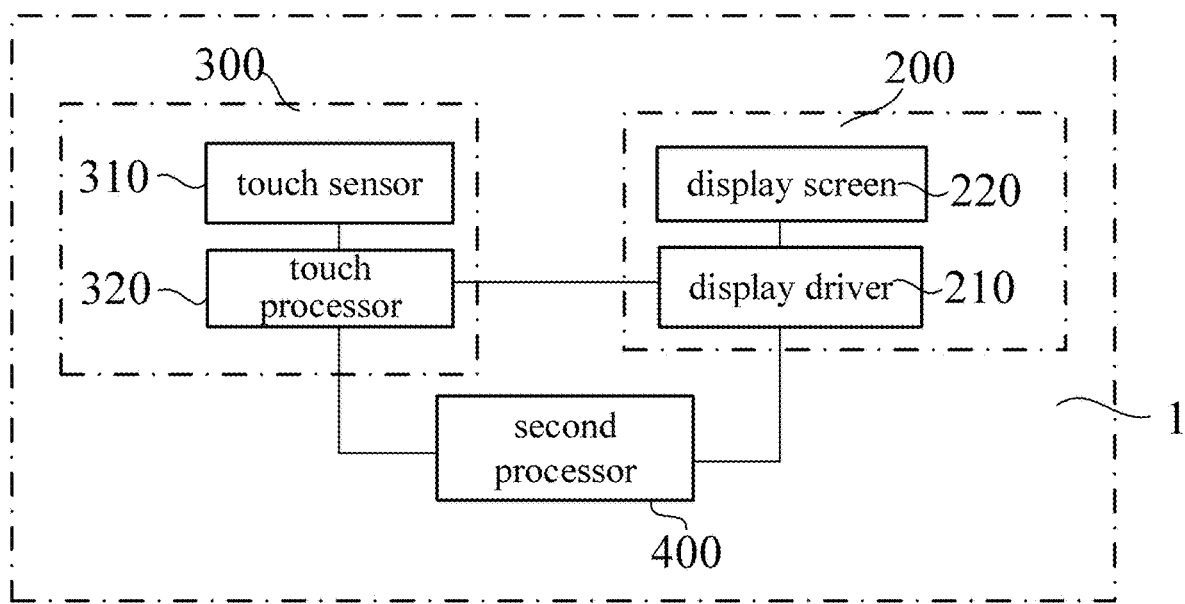
FIG. 1C is a block diagram of an electronic device according to some embodiments of the present disclosure.

FIGS. 1A, 1B, and 1C show a general structure of an electronic device 1, taking a mobile phone as an example. The electronic device 1 can comprise: a display device 200 configured to display a picture, and a touch module 300 configured to sense a touch signal and process the sensed touch signal to obtain corresponding touch information. The electronic device 1 can further comprise: an electronic component coupled to at least one of the display device 200 and the touch module 300.

Exemplarily, the electronic component can comprise: at least one processor coupled to both the display device 200 and the touch module 300 (in order to distinguish from a first processor hereinafter, the processor located outside the display device 200 here is referred to as a second processor 400 hereinafter). The electronic component can further comprise: a printed circuit board, wherein the second processor 400 can be mounted on the printed circuit board, and both the display device 200 and the touch module 300 are coupled to the second processor 400 through the printed circuit board. In addition, the electronic component can further include a sound component, a camera component, and the like.

The second processor 400 can control an overall operation of the electronic device 1. The second processor 400 can be a central processing unit (CPU), an application processor (AP), a communication processor (CP), or the like. For example, when the electronic device 1 is a mobile phone, the second processor 400 can be an AP; and when the electronic device 1 is a desktop or laptop computer, the second processor 400 can be a CPU.

Furthermore, the electronic device 1 can further comprise: a housing 110 configured to form an external appearance of the electronic device 1 and protect the electronic device 1. The display device 200 can be fixed to one of surfaces of the housing 110 together with a cover glass by an adhesive such as foam glue, and exposed outside through the cover glass, thereby forming a relatively closed space together with the housing 110. The above electronic component can be disposed in the space.

Referring to FIG. 1C, the touch module 300 comprises at least one touch sensor 310 and at least one touch processor 320. The touch sensor 310 can be used as an input device of the electronic device 1 for implementing interaction between a user and the electronic device 1. The touch sensor 310 is configured to sense a touch operation and/or a fingerprint image. The touch processor 320 is configured to generate touch information. For example, the touch processor 320 can generate touch information corresponding to the touch operation sensed by the touch sensor 310.

Figure 2:
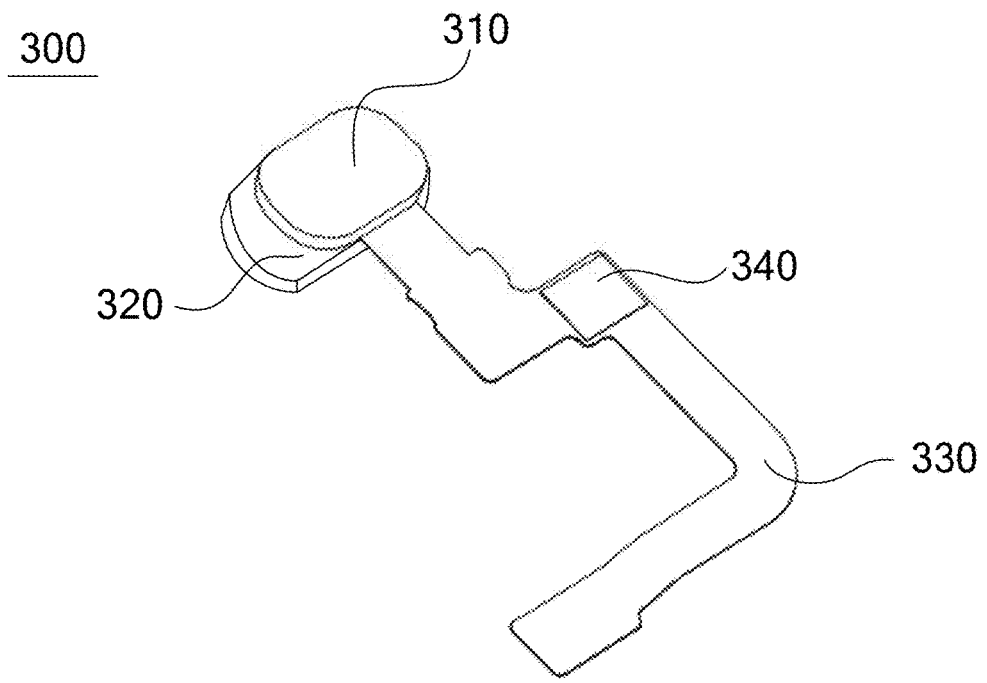
FIG. 2 is a structural diagram of a touch module in the display device shown in FIG. 1A.

FIG. 2 shows a schematic structural diagram of the touch module 300 in FIG. 1A. The touch sensor 310 can be a touch key shown in FIG. 2 for sensing a touch operation, such as pressing, clicking, etc., or for sensing a fingerprint image, and it can be one of the following sensors: e.g., a pressure sensor, an optical sensor, an infrared sensor, an ultrasonic sensor, etc. The touch processor 320 can comprise, for example, a chip with a graphic processing function, and is used for digitizing the touch operation or fingerprint image (i.e., touch signal) sensed by the touch sensor 310, to generate the corresponding touch information. Exemplarily, the touch information can be a string of binary numerical codes. When the touch operation is sensed by the touch sensor 310, the corresponding touch information is gesture operation information for at least one touch key. When the fingerprint image is sensed by the touch sensor 310, the corresponding touch information is fingerprint information. The touch module 300 can further comprise a flexible circuit board 330. The touch processor 320 is mounted on the flexible circuit board 330, and the touch sensor 310 is coupled to one end of the flexible circuit board 330, and the other end of the flexible circuit board 330 is coupled to the printed circuit board of the electronic device 1, to realize coupling the touch processor 320 to the display device 200 through the flexible circuit board 330 and the printed circuit board.

The touch sensor 310 in the touch module 300 shown in FIG. 1A can further comprise: a touch layer. The touch layer is disposed in an active area (AA for short) of the electronic device 1 (e.g., the display device 200) to be configured to sense a touch operation in the AA. For example, the touch layer can sense a user's touch position on a screen, and/or sense a user's touch operation, for example, a gesture such as clicking, long-pressing, sliding, etc., and therefore, obtains a touch signal. In addition, the touch processor coupled to the touch layer converts the touch signal sensed by the touch layer into corresponding touch information. Exemplarily, the touch information can comprise: position coordinates of a touch point, and/or touch gesture information. In addition, the touch sensor 310 coupled to the touch layer and the touch sensor 310 coupled to the touch key can be the same or different.

The touch layer can be a separate component laminated to the display surface of the display device 200, or can be integrated in the display device 200.

Figure 3:
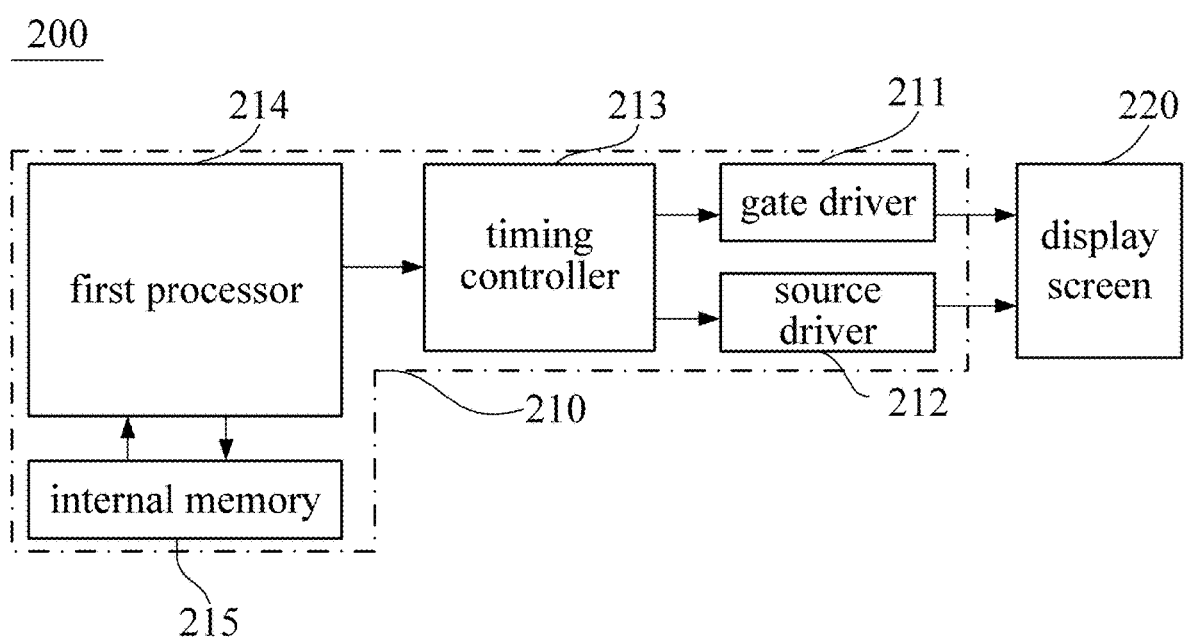
FIG. 3 is a block diagram of a display module in an electronic device according to some embodiments of the present disclosure.

Referring to FIG. 1C, the touch module 300 shown in FIG. 1B can comprise at least one touch sensor 310 and at least one touch processor 320. The at least one touch sensor is disposed in an active area (AA for short) of the display device 200, and configured to sense a touch signal (also referred to as a touch signal) of the AA, for example, it can sense at least one of a user's touch position on a screen, a user's touch operation, and a fingerprint image. Accordingly, the touch processor 320 converts the touch signal sensed by the touch layer into corresponding touch information. Exemplarily, the touch information can comprise: at least one of position coordinates of a touch point, touch gesture information and fingerprint information. FIG. 3 illustrates an architecture diagram of a display device 200 according to some embodiments of the present disclosure. The display device 200 is configured to display a corresponding image based on the touch information output by the touch module 300 (e.g., the touch processor 320), and comprises a display driver 210 and a display screen 220.

The display screen 220 is configured to perform display under the control of a driving signal input by the display driver 210. The display screen 220 can be an LCD (Liquid Crystal Display) display screen, micro LED (including a miniLED or microLED) display screen, OLED (Organic Light Emitting Diode) display screen, QLED (Quantum Dot Light Emitting Diode) display screen, or the like.

The display driver 210 is configured to drive the display screen 220 to display various images according to image data, and can be, for example, a DDIC. Exemplarily, the display driver 210 comprises: a gate driver 211, a source driver 212, and a timing controller (also referred to as a sequential controller, i.e., TCON) 213. The gate driver 211 is configured to input a scan driving signal to the display screen 220, to control turning on/off each row of sub-pixels in the display screen 220; the source driver 212 is configured to input a gray-scale control signal (i.e., a data driving signal) of a row of turned-on sub-pixels to the display screen 220 according to the image data (also referred to as an image data signal); and the timing controller 213 is configured to input a corresponding control signal to the gate driver 211 and output, to the source driver 212, corresponding image information which can comprise the image data and the image control signal, to control the gate driver 211 and the source driver 212.

The display driver 210 is coupled to the touch processor 320 and is further configured to determine image data to be displayed based on the touch information.

Specifically, the display driver 210 is configured to receive the touch information sent by the touch processor 320; and in the case where an operation mode of the electronic device 1 is a first operation mode, send first indication information to the touch processor 320, the first indication information indicating that image data to be displayed is determined by the display driver 210, to inform the touch processor 320 that the display driver 210 can obtain the image data to be displayed without obtaining the image data to be displayed through another processor (e.g., the second processor 400).

Exemplarily, the display driver 210 is configured to identify the operation mode of the electronic device 1 after receiving the touch information sent by the touch processor 320. For example, the display driver 210 identifies the current operation mode of the electronic device 1, in response to the touch information sent by the touch processor 320; and if the identified operation mode is the first operation mode, the first indication information is sent to the touch processor 320.

The operation mode (also referred to as a driving mode, which can be, for example, a screen mode) of the electronic device 1 can include: a first operation mode and a second operation mode. The second operation mode can include a normal mode, etc. In the normal mode, the electronic device 1 can respond to various operations of the user or communication functions, etc. supported by the electronic device 1. The first operation mode can be any operation mode except the normal mode. Exemplarily, in the first operation mode, the electronic device 1 can disable part of functions of the electronic device, by stopping power supply to at least some of various hardware modules it contains (e.g., AP, CPU, hard disk, etc.). Exemplarily, in the case where at least part of functions of the second processor 400 is temporarily disabled by the electronic device 1, the image display in the first operation mode can be implemented by the display driver 210, so that the electronic device 1 can consume less power and use less resources. The first operation mode can include a mode in which some components in the electronic device 1 are not powered or operate with low power, such as an always-on-display mode (AOD mode), a sleep mode (also referred to as an inactive mode), a deep sleep mode (also referred to as a deep inactive mode), and an sleep-exiting mode, and can include a power-off mode. When the electronic device 1 is in the always-on-display mode, the display screen 220 thereof can have an electronic clock or a digital clock displayed thereon, and can also have the number of unread messages, and weather information, etc. displayed thereon. The sleep mode is that the electronic device 1 is in a power-on state but the display screen 220 is in a screen-off state, that is, the screen has no image displayed thereon and is completely black, and the electronic device 1 can be restored to a state before a sleep after being awakened; and if the power supply is cut off, it cannot be restored to the state before the sleep even if being started. The deep sleep mode is that the display screen 220 of the electronic device 1 is equally in the screen-off state and consumes less power than the sleep mode; and the electronic device 1 can be restored to the state before the sleep after being awakened. The sleep-exiting mode is that the electronic device 1 is awakened from the sleep mode or the deep sleep mode, and a last frame of image before the sleep is displayed on the display screen 220.

When the electronic device 1 is in the first operation mode, obtaining of the image data is performed by the display driver 210. The display driver 210 is further configured to determine first image data according to the first operation mode and the touch information, and drive the display screen 220 to display according to the first image data. For example, the display driver 210 can input the first image data and a corresponding image control signal to the timing controller 213, so that the gate driver 211 and the source driver 212 drive the display screen 220 to display an image corresponding to the first image data under the control of the timing controller 213.

The image data to be displayed when the electronic device 1 is in the first operation mode is referred to as the first image data, for example, the first image data can be image data needing to be displayed on the display screen 220 triggered by the touch operation when the electronic device 1 is in any of the above first operation modes.

Figure 4:
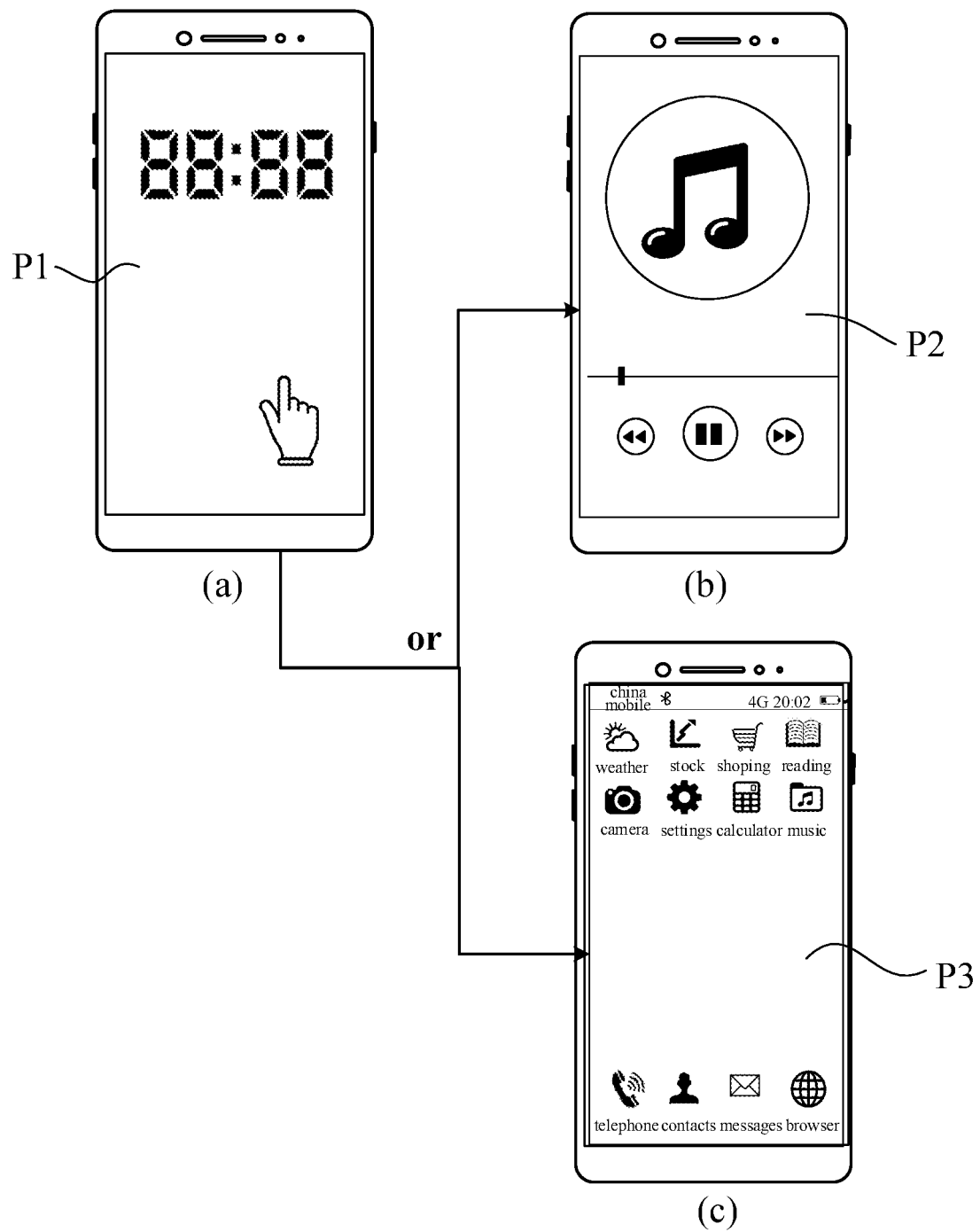
FIG. 4 is a diagram of a display interface of an electronic device in a first operation mode according to some embodiments of the present disclosure.

Exemplarily, if the electronic device 1 is in the first operation mode, e.g., the AOD mode, the display screen 220 can display, e.g., an always-on-display image P1 shown in (a) of FIG. 4. When the touch key on the electronic device 1 is pressed, or the touch operation such as clicking or touching is applied in the AA of the electronic device 1, the touch processor 320 in the electronic device 1 generates corresponding touch information and sends the touch information to the display driver 210. The display driver 210 sends, when identifying that the electronic device 1 is currently in the AOD mode, the first indication information to the touch processor 320; and acquires the corresponding first image data in response to the AOD mode and the touch information, and drives the display screen 220 to display, for example, a last frame of image P2 of (b) of FIG. 4 before entering the AOD mode or a desktop image (also referred to as a desktop UI or a main menu interface) P3 shown in (c) of FIG. 4, and thereafter, the electronic device 1 enters the second operation mode.

Figure 5:
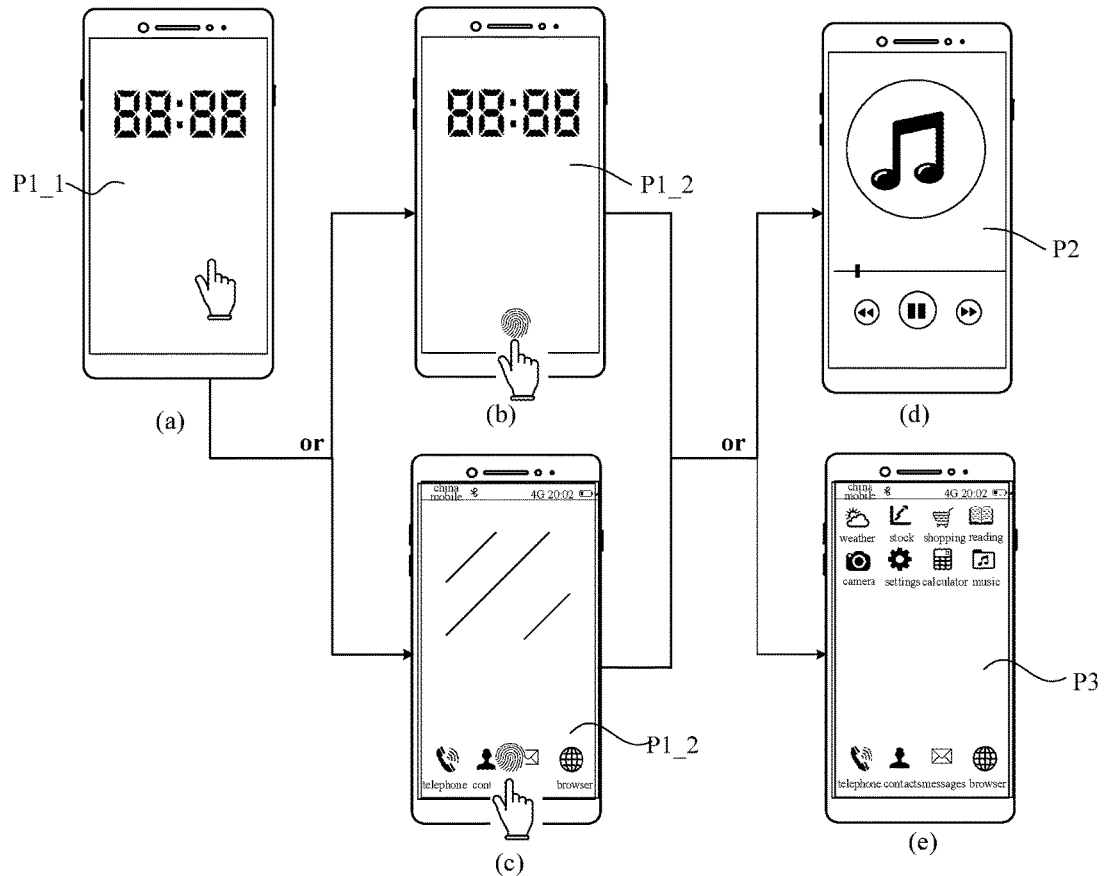
FIG. 5 is a diagram of another display interface of an electronic device in a first operation mode according to some embodiments of the present disclosure.

Further exemplarily, if the electronic device 1 is in the first operation mode, for example, the AOD mode, the display screen 220 can has for example, an always-on-display image P1_1 shown in (a) of FIG. 5 displayed thereon. When the touch key on the electronic device 1 is pressed, or the touch operation such as clicking or touching is applied in the AA of the electronic device 1, the touch processor 320 in the electronic device 1 generates corresponding touch information and sends the touch information to the display driver 210. The display driver 210 sends, when identifying that the electronic device 1 is currently in the AOD mode, the first indication information to the touch processor 320; and in response to the AOD mode and the touch information, acquires the corresponding first image data, and drives the display screen 220 to display an always-on-display image P1_2 shown in (b) or (c) of FIG. 5. Referring to (b) of FIG. 5, the always-on-display image P1_2 can be formed by adding a fingerprint symbol to a specific area (corresponding to a fingerprint identification area in the electronic device 1) on the always-on-display image P1_1; and referring to (c) of FIG. 5, the always-on-display image P1_2 can also be formed by adding a fingerprint symbol to a specific area on the screen-locking interface.

Thereafter, when the touch operation such as pressing, touching or the like is applied to the fingerprint identification area of the electronic device 1, the touch processor 320 in the electronic device 1 generates corresponding touch information including fingerprint information and sends the touch information to the display driver 210. In the case where the fingerprint information matches preset fingerprint information (pre-entered user fingerprint information), in response to the AOD mode and the fingerprint information, the display driver 210 acquires the corresponding first image data to drive the display screen 220 to display, for example, a last frame P2 of (d) of FIG. 5 before entering the AOD mode or a desktop image (also referred to as a desktop UI, or a main menu interface) P3 shown in (e) of FIG. 5, thereby completing an unlocking operation in the AOD mode. Thereafter, the electronic device 1 exits the AOD mode and enters the second operation mode. In addition, in the case where the fingerprint information does not match the preset fingerprint information, the display driver 210 determines and drives the display screen 220 to display an image containing user prompt information such as "fingerprint information does not match, please re-enter".

Otherwise, the display process of the electronic device 1 in the first operation mode except the AOD mode can also be implemented by a similar processing process without passing through the second processor 400. Exemplarily, when the electronic device 1 is in the sleep mode, the touch sensor 310 is pressed, the touch sensor 310 of the touch module 300 can sense a pressing gesture and the touch processor 320 converts the pressing gesture into touch information, and send the touch information to the first processor 214 of the display driver 210, the process of the first processor 214 can be similar to the fingerprint unlocking process described above, but at least a part of its determined first image data can be different from the first image data in the fingerprint unlocking process described above, so that in a display process of the electronic device 1 switching from the sleep mode to the normal mode, some of the displayed images can be different from the images in the fingerprint unlocking process. For example, in the display process, in the sleep mode, the electronic device can display, after subjected to the first touch operation, an image obtained by adding a fingerprint symbol to a black picture.

By the electronic device provided by the above embodiment, on one hand, since the first image data is obtained by the display driver without another processor (a processor except the touch processor and the display driver in the electronic device, such as an AP, etc.) in the electronic device, power consumption of the other processor is reduced. On the other hand, compared with the related art in which the touch processor transmits the touch information to the other processor, the other processor obtains the corresponding image data and sends the image data to the display driver, and then the display driver drives the display screen to display, in the embodiment of the present disclosure, in the case where the electronic device is in the first operation mode, the touch processor and the display driver are directly interacted to drive the display screen to display, so that the response of the electronic device can be speeded up.

Figure 6:
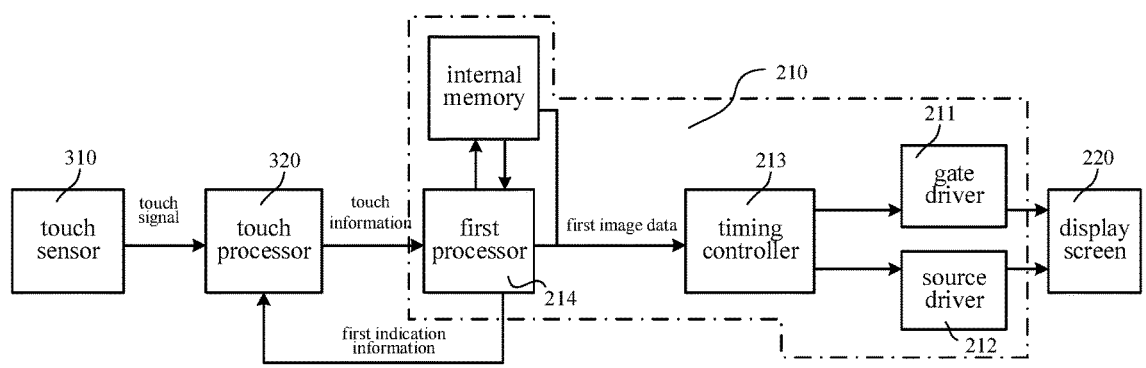
FIG. 6 is a flow diagram of data processing of an electronic device in a first operation mode according to some embodiments of the present disclosure.

In some embodiments, referring to FIGS. 3 and 6, the display driver 210 can further comprise: a first processor 214. The first processor 214 here can be a logic circuit, and can also be an FPGA, a microprocessor, or the like. The first processor 214 is configured to receive the touch information send by the touch processor 320 and send the first indication information to the touch processor 320. The first processor 214 is further configured to determine the first image data according to the first operation mode and the received touch information, and drive the display screen 220 to display according to the first image data. Exemplarily, the first processor 214 can acquire the first image data corresponding to the first operation mode and the touch information from a memory (e.g., the memory can be located inside the display driver, and can be located outside the display driver and coupled to the first processor 214). The first processor 214 can further perform data processing, for example, can generate first image data corresponding to the first operation mode and the touch information based on image data of an image stored in the memory, the first operation mode, and the touch information.

In some embodiments, referring to FIGS. 3 and 6, the display driver 210 can comprise: the first processor 214 and an internal memory 215, which are coupled to each other. The internal memory 215 is configured to store data information. The data information can comprise, for example, image data of at least one image such as a desktop image, a last frame of image before the electronic device 1 switches from the second operation mode to the first operation mode, a screen-locking image with a fingerprint symbol, an always-on-display image, and the like; and the data information can further comprise fingerprint information pre-entered by the user, image data of a fingerprint symbol, and the like.

It should be noted that when the electronic device 1 enters the sleep mode of the first operation mode from the second operation mode, before the screen is off, the second processor 400 can send image data of a last frame before the screen is off to the display driver 210 and store it in the internal memory 215 of the display driver 210. When the electronic device 1 is unlocked again, the processor 214 of the display driver 210 can directly extract the image data from the internal memory 215 and display the image data as the first image data, thereby speeding up the response and saving the power consumption of the second processor 400.

Exemplarily, the first processor 214 is configured to select image data of an image from the internal memory 215 as the first image data according to the first operation mode and the touch information. That is, the first image data can be pre-stored in the internal memory 215 of the display driver 210, and directly read from the internal memory 215 by the first processor 214.

For example, image data of the images shown in (c), (d), and (e) of FIG. 5 can be stored in the internal memory 215, correspondences between the first operation mode and the touch information and the image data are pre-configured in the electronic device 1, and the first processor 214 can select appropriate first image data from the internal memory 215 according to the correspondences. Since the first processor 214 can directly read the corresponding first image data, the display driver is caused to operate at a higher speed.

Exemplarily, the first processor 214 is configured to select image data of an image from the internal memory 215 according to the first operation mode and the touch information, and correct the selected image data by using correction data, to obtain the first image data.

For example, image data of the images shown in (a), (b), and (c) of FIG. 5 can be stored in the internal memory 215. For example, the internal memory 215 can have clock pattern template data, a screen-locking image, and the like stored therein, and the image P1_1 shown in (a) of FIG. 5, which contains the current time, can be generated by the first processor 214 through first selecting the clock pattern template data from the internal memory 215 and then correcting time in the clock pattern template data according to current system time. The image P1_2 shown in (b) of FIG. 5 can be generated by the first processor 214 through first selecting the clock pattern template data from the internal memory 215, then correcting time in the clock pattern template data according to the current system time, and correcting data of a specific area in the clock pattern template data by using image data of a fingerprint symbol. The image P1_2 shown in (c) of FIG. 5 can be generated by correcting data of a specific area in image data of a main menu interface by using image data of a fingerprint symbol.

Correspondences between the first operation mode and the touch information and the image data as well as the correction data are pre-configured in the electronic device 1, and the first processor 214 can select appropriate image data from the internal memory 215 according to the correspondences and read appropriate correction data to generate the first image data. Since the first processor 214 can perform the correction process to generate the required image data, and memory space occupied by the correction data is much smaller than memory space occupied by the entire image data, the memory space in the electronic device can be saved.

With the rapid development of electronic technology, designers put forward a new design idea of screen-off fingerprint blind unlocking (required that identification and unlocking anywhere in a display screen AA can be performed without the design of a fingerprint identification specific area) for the electronic device such as a mobile phone and a tablet personal computer, and the design idea requires the faster response of the electronic device.

To speedup the response of the electronic device to the touch operation, in some embodiments, the touch processor 320 and the display driver 210 can be coupled by using a serial peripheral interface (SPI) interface. The SPI interface typically includes the following pins: SCLK, MOSI, MISO, CSn, wherein SCLK is a serial clock for synchronizing data transmission and output by a master; MOSI is a master-out/slave-in data pin; MISO is a master-in/slave-out data pin; CSn is a chip select pin, enabled by a low level, and output by a master, wherein the master determines, through a chip select line, a slave with which it communicates since there can be a plurality of slaves but only one master on an SPI bus at a certain moment. n represents a slave serial number, for example, if the slave serial number is "1", a CS1 pin of the slave is connected to a CS1 pin of the master.

Figure 7:
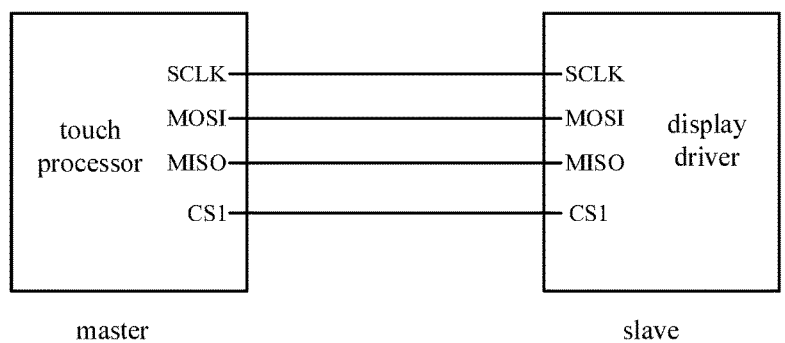
FIG. 7 is a structural diagram of a connection of a touch processor and a display driver in FIG. 1C through SPI interfaces.

Exemplarily, FIG. 7 shows the SPI interface pins and wiring of the touch processor 320 and the display driver 210. The touch processor 320 is configured as the master, the display driver 210 is configured as the slave, the touch processor 320 comprises a first SPI interface, and the display driver 210 comprises a second SPI interface. An SCLK pin of the first SPI interface is connected with an SCLK pin of the second SPI interface to form a clock line, an MOSI pin of the first SPI interface is connected with an MOSI pin of the second SPI interface to form an MOSI data line, an MISO pin of the first SPI interface is connected with an MISO pin of the second SPI interface to form an MISO data line, and a CS1 pin of the first SPI interface is connected with a CS1 pin of the second SPI interface to form a CSI chip select line. The MOSI data line and MISO data line are used for data transmission, for example, the touch information from the touch processor 320 is transmitted to the display driver 210 via the MOSI data line, and the first indication information sent by the display driver 210 is transmitted to the touch processor 320 via the MISO data line.

Since the SPI supports duplex communication, data transmission efficiency can be improved thereby. Exemplarily, once the electronic device 1 enters the first operation mode, the second processor 400 or the display driver 210 (e.g., the first processor 214) can store the first indication information (which can be, for example, a binary number "1" to indicate that a subsequent display process can be completed by the display driver 210) in a shift register of the display driver 210, and while the touch information sent by the touch processor 320 is transmitted to the display driver 210 via the MOSI data line, the display driver 210 synchronously transmits the first indication information to the touch processor 320 via the MISO data line, so that data exchange between the touch processor 320 and the display driver 210 is synchronized, so that the data transmission efficiency between them is higher.

Figure 8:
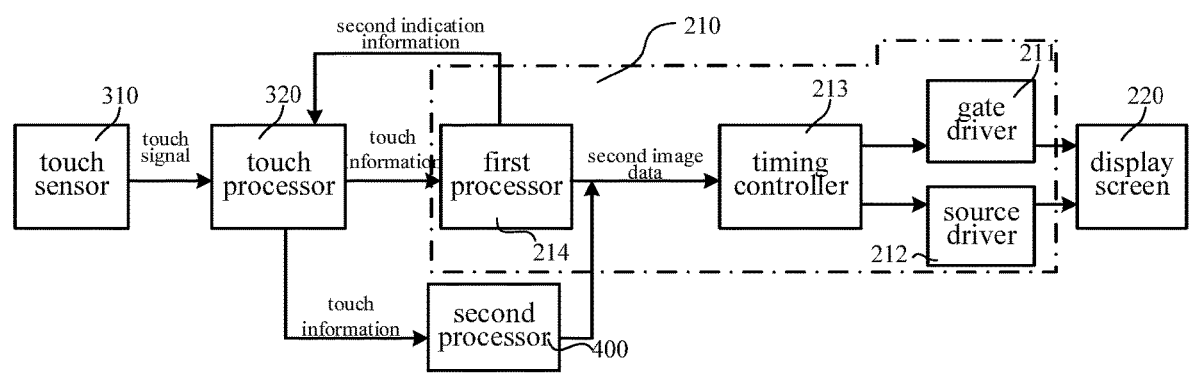
FIG. 8 is a flow diagram of data processing of an electronic device in a second operation mode according to some embodiments of the present disclosure.

In some embodiments, referring to FIG. 8, the display driver 210 (which can be, for example, the first processor 214 in the display driver 210) is further configured to send, when the electronic device 1 is in the second operation mode, second indication information to the touch processor 320, the second indication information indicating that image data (i.e., second image data) to be displayed is determined by the second processor 400. For example, the second indication information can be a binary number "0".

The second operation mode refers to the electronic device 1 being in another operation mode except the first operation mode. When the electronic device 1 is in the second operation mode, the image data for controlling the display of the display screen 220 is obtained by the second processor 400, that is, the process of displaying the image in the second operation mode is performed by the second processor 400.

Exemplarily, when the electronic device 1 is in the second operation mode (e.g., the normal mode), if the electronic device 1 receives the touch operation from the user, the first processor 214 of the display driver 210 receives the touch information sent by the touch processor 320. The first processor 214 identifies that a current operation mode is not the first operation mode, and at this time, the first processor 214 does not perform the process of determining the image data any more, but sends, to the touch processor 320, the second indication information indicating that the image processing is performed by the second processor 400. For example, when the user performs a payment operation by using the electronic device 1 and verifies payment information through a fingerprint, the touch sensor 310 of the touch module 300 first senses a fingerprint image of the user, and the fingerprint image is converted into fingerprint information through digitalization by the touch processor 320, and the fingerprint information is transmitted to the first processor 214 of the display driver 210. At this time, however, the first processor 214 identifies that the electronic device 1 is currently in the second operation mode, and therefore, it does not perform matching processing on the fingerprint information, and further does not determine the first image data, but sends the second indication information to the touch processor 320, to inform the touch processor 320 that the second processor 400 performs the fingerprint matching and the subsequent image display process.

Continuously referring to FIG. 8, the touch processor 320 is further coupled to the second processor 400, and the touch processor 320 is further configured to send the touch information to the second processor 400 in response to the second indication information. The second processor 400 can be coupled to the display driver 210, the second processor 400 being configured to determine the second image data according to the second operation mode and the touch information and send the second image data to the display driver 210, for example, to the timing controller in the display driver 210. The display driver 210 is further configured to drive the display screen to display according to the second image data; for example, the timing controller drives the display screen to display the second image data by controlling the gate driver and the source driver.

The image data for displaying the image in the second operation mode is referred to as the second image data. For example, the electronic device 1 is currently playing news, and the second processor 400 provides the second image data to the timing controller at this time, so the second image data is image data corresponding to each frame of the news video.

Figure 9:
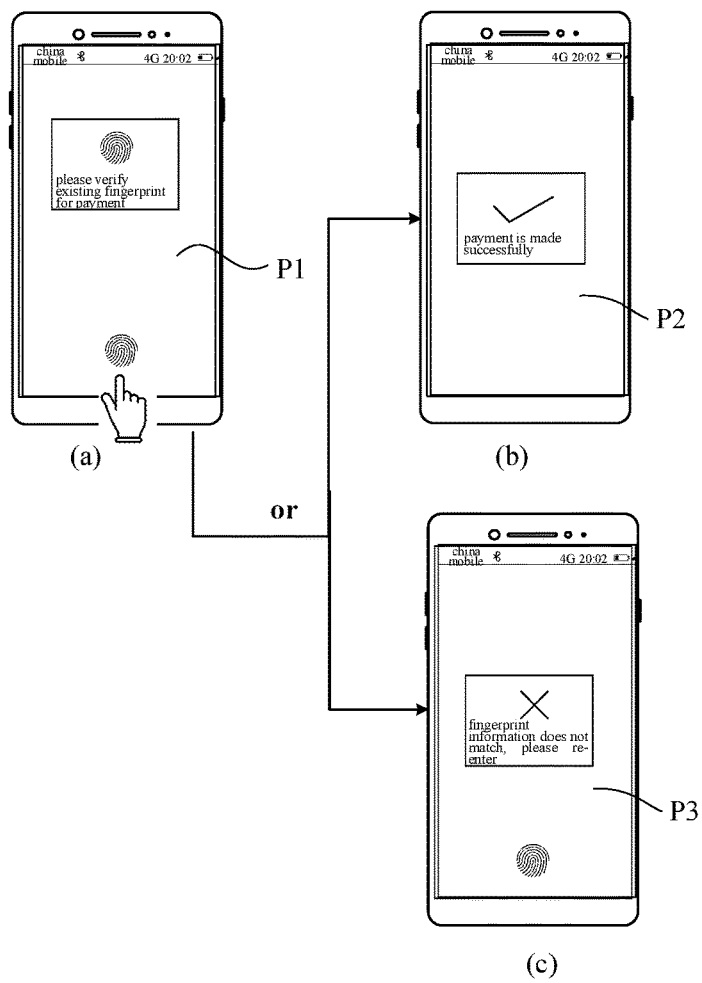
FIG. 9 is a diagram of a display interface of an electronic device in a second operation mode according to some embodiments of the present disclosure.

Exemplarily, the electronic device 1 has a payment interface P1 shown in (a) of FIG. 9 thereon displayed, when the user performs a payment operation by using the electronic device 1 and makes payment through fingerprint verification, the touch processor 320 sends, after receiving the second indication information, the generated fingerprint information to the second processor 400 in response to the second indication information, the second processor 400 compares the received fingerprint information with preset fingerprint information in a memory (which can be located inside or outside the display driver) of the electronic device 1, and if the two fingerprint information match, the second processor 400 will obtain image data of an image "payment is made successfully" and uses it as the second image data, and transmits the second image data to the timing controller, to drive the display screen to display the image P2 of "payment is made successfully" shown in (b) of FIG. 9; and if the fingerprint information received by the second processor 400 does not match the preset fingerprint information in the memory of the electronic device 1, referring to (c) of FIG. 9, the display screen will have thereon displayed an image containing information that "fingerprint information does not match, please re-enter", and image data of the image is the second image data.

In the above embodiment, after receiving the touch information, the display driver 210 first prejudges the current operation mode of the electronic device 1, and submit the image display in the second operation mode that cannot be processed by the display driver 210, to the second processor 400 for further processing, so that the gate driver 211 can continue to perform operation in the case where some functions of the display driver 210 are limited, so that the display function of the electronic device 1 is improved.

In some embodiments, referring to FIG. 2, the touch module 300 can further comprise a switching circuit 340. The touch processor 320 needs to send its generated touch information to a processing device with processing capability for processing. Exemplarily, the processing device can be the second processor 400 of the electronic device 1, and can also be the first processor 214 of the display driver 210. For example, when the user uses the fingerprint to unlock the electronic device 1, first, a fingerprint image of the user is sensed through the touch sensor 310, and then the touch processor 320 processes the fingerprint image into corresponding fingerprint information; and the touch processor 320 further needs to have the capability to select a processing device to process the touch information. Therefore, the switching circuit 340 can be integrated into a touch chip (touch IC) which is used as the touch processor 320, or can be disposed outside the touch chip and coupled to the touch chip, and the touch chip and the switching circuit 340 coupled at this time serve as the touch processor 320, and select a transmission path of the touch information by using the switching circuit 340, so that the touch information can reach a desired processing device.

The switching circuit 340 is configured to send third indication information to the second processor 400 in response to the second indication information, the third indication information indicating that image data of the image to be displayed is determined by the second processor 400, and the second processor 400 is configured to determine the second image data according to the second operation mode and the touch information in response to the third indication information. That is, after receiving the second indication information, the touch processor 320 controls the switching circuit 340 of the touch module 300 to perform a switching operation, i.e., sending the third indication information to the second processor 400 through the switching circuit 340, informing that the second processor 400 processes the touch information, and generating the second image data based on the currently displayed image in the second operation mode.

Figure 10:
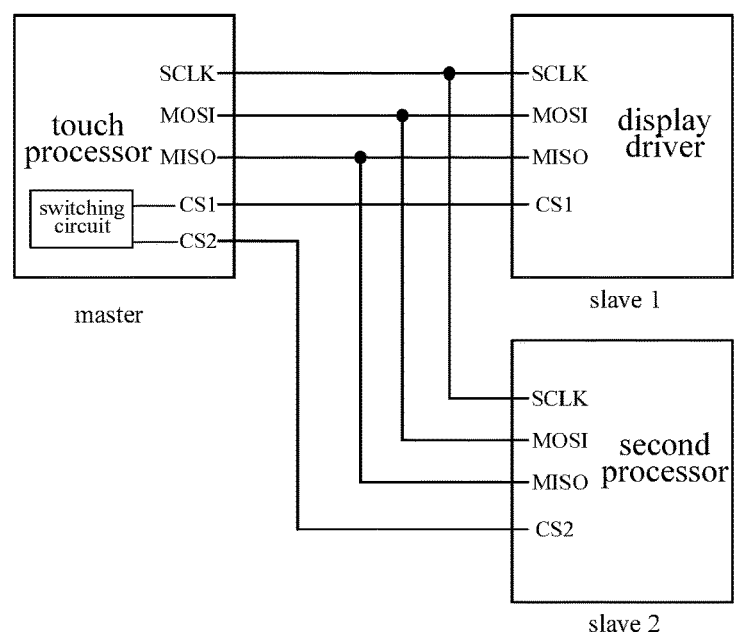
FIG. 10 is a structural diagram of connections of the touch processor, the display driver and the second processor in FIG. 1C through SPI interfaces.

In some embodiments, the touch processor 320, the display driver 210, and the second processor 400 can be coupled to each other through the SPI interface. FIG. 10 shows the SPI pins and their wiring of this embodiment. The touch processor 320 is set as a master, the display driver 210 and the second processor 400 are set as slaves, the touch processor 320 comprises a first SPI interface, the display driver 210 comprises a second SPI interface, and the second processor 400 comprises a third SPI interface. The second SPI interface and third SPI interface both are coupled with the first SPI interface. An SCLK pin of the first SPI interface is connected with an SCLK pin of the second SPI interface to form a clock line, an MOSI pin of the first SPI interface is connected with an MOSI pin of the second SPI interface to form an MOSI data line, a MISO pin of the first SPI interface is connected with a MISO pin of the second SPI interface to form a MISO data line, and a CS1 pin of the first SPI interface is connected with a CS1 pin of the second SPI interface to form a CSI chip select line; and SCLK, MOSI and MISO pins of the third SPI interface are respectively connected to the SCLK clock line, the MOSI data line and the MISO data line, and a CS2 pin of the third SPI interface is connected with a CS2 pin of the first SPI interface to form a CS2 chip select line. The touch processor 320 respectively perform chip select for the display driver 210 and the second processor 400 through the chip select lines CS1 and CS2, to select a slave with which the touch processor 320 communicates. Similarly, since the SPI supports duplex communication, the communication efficiency among the touch processor 320, the display driver 210, and the second processor 400 can be improved.

In some embodiments, the switching circuit 340 of the touch module 300 selects the communication slave of the touch processor 320 by controlling an electrical signal of the chip select line. For example, when the touch processor 320 communicates with the display driver 210, a low level is input to the CS1, and a high level is input to the CS2; and when the touch processor 320 communicates with the second processor 400, the high level is input to the CS1 and the low level is input to the CS2.

Embodiments of the present disclosure further provide a display method of an electronic device 1. The electronic device 1 comprises: a touch processor 320 and a display driver 210 coupled to each other. The electronic device 1 can further comprise a second processor 400.

Figure 11:
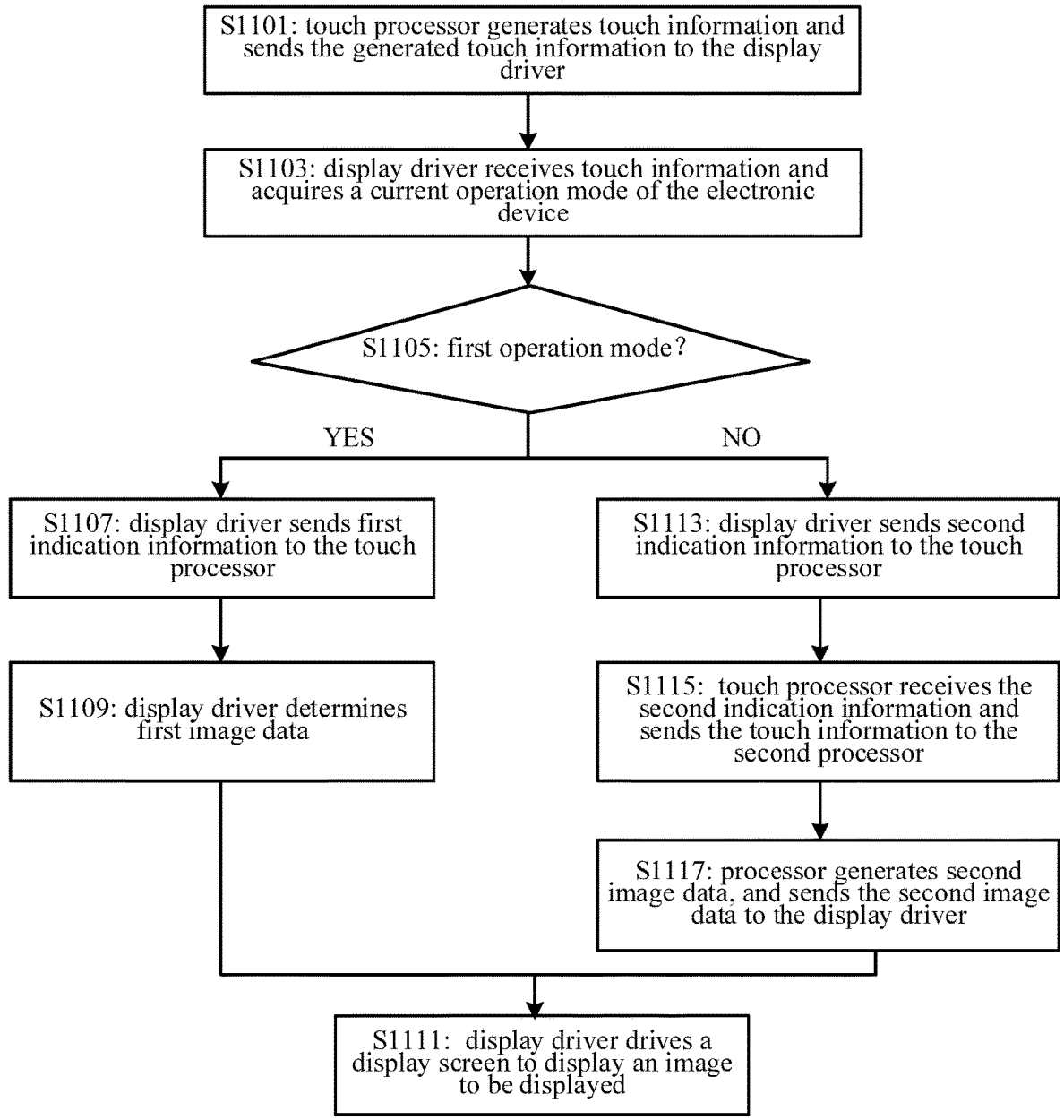
FIG. 11 is a flow diagram of a display method of an electronic device according to some embodiments of the present disclosure.

Referring to FIG. 11, the display method of the electronic device 1 comprises the following steps.

In step S1101, the touch processor 320 generates touch information and sends the touch information to the display driver 210.

In step S1103, the display driver 210 receives the touch information and acquires (i.e., identifies) a current operation mode of the electronic device 1.

In step S1105, the display driver 210 determines whether the current operation mode is a first operation mode. If the current operation mode is the first operation mode, step S1107 is executed; and if the current operation mode is a second operation mode, the flow goes to step S1113.

In step S1107, the display driver 210 sends, to the touch processor 320, first indication information indicating that image data to be displayed is determined by the display driver 210.

In step S1109, the display driver 210 determines first image data according to the first operation mode and the touch information.

In step S1111, the display driver 210 drives a display screen 220 to display an image to be displayed. Since it is the first image data that is determined in the step S1109, display is performed according to the first image data in this step.

In some embodiments, the display driver has therein stored image data of at least one image. Exemplarily, the step S1109 can comprise: according to the first operation mode and the touch information, selecting image data of an image from the stored image data as the first image data, or selecting image data of an image from the stored image data, and correcting the selected image data by using correction data, to obtain the first image data, wherein the display driver 210 has therein stored the image data of the at least one image.

In step S1113, the display driver 210 sends, to the touch processor 320, second indication information indicating that the image data to be displayed is determined by the second processor 400.

In step S1115, the touch processor 320 receives the second indication information and sends the touch information to the second processor 400 in response to the second indication information.

In step S1117, the second processor 400 receives the touch information, determines second image data according to the second operation mode and the touch information, and sends the second image data to the display driver 210.

In step S1111, the display driver 210 drives a display screen 220 for display. Since it is the second image data that is determined in step S1117, display is performed according to the second image data in this step.

The specific implementation of each step in the display method of the electronic device in the embodiment of the present disclosure can refer to the functional description of each device in the electronic device in the above embodiment, which is not repeated herein, and the display method can also reduce the power consumption of the second processor and speed up the response of the electronic device to the touch operation.

Finally, it should be noted that: the above examples are only intended to illustrate the technical solutions of the present disclosure, not to limit them; although the present disclosure has been described in detail with reference to the foregoing embodiments, it should be understood by those of ordinary skill in the art that: the technical solutions described in the foregoing embodiments can still be modified, or some of technical features thereof can be equivalently replaced; and these modifications and substitutions do not depart the essence of corresponding technical solutions thereof from the spirit and scope of the technical solutions of the embodiments of the present disclosure.

What is claimed is:

1. An electronic device, comprising:
a touch processor configured to generate touch information;
a second processor; and
a display driver directly coupled to or in direct communication with the touch processor and configured to:
receive the touch information sent by the touch processor;
send first indication information to the touch processor when the electronic device is in a first operation mode, the first indication information indicating that image data to be displayed is determined by the display driver without using the second processor;
determine first image data according to the first operation mode and the touch information;
drive a display screen to display according to the first image data; and
send second indication information to the touch processor when the electronic device is in a second operation mode, the second indication information indicating that image data to be displayed is determined by the second processor, wherein:
the touch processor is further configured to send the touch information to the second processor in response to the second indication information;
the second processor is configured to determine second image data according to the second operation mode and the touch information and send the second image data to the display driver; and
the display driver is further configured to drive the display screen to display according to the second image data.

2. The electronic device according to claim 1, wherein:
the touch processor comprises a first serial peripheral interface (SPI) interface, and the display driver comprises a second SPI interface, the second SPI interface being coupled to the first SPI interface.

3. The electronic device according to claim 1, wherein the display driver comprises:
an internal memory configured to store image data of at least one image; and
a first processor configured to:
receive the touch information sent by the touch processor;
send the first indication information to the touch processor when the electronic device is in the first operation mode; and
according to the first operation mode and the touch information, select image data of an image from the internal memory as first image data.

4. The electronic device according to claim 1, wherein the display driver comprises:
an internal memory configured to store image data of at least one image; and
a first processor, the first processor being configured to:
receive the touch information sent by the touch processor;
send the first indication information to the touch processor when the electronic device is in the first operation mode; and
according to the first operation mode and the touch information, select image data of an image from the internal memory and correct the selected image data by using correction data, to obtain first image data.

5. The electronic device according to claim 1, wherein the touch processor comprises a switching circuit configured to send third indication information to the second processor in response to the second indication information, the third indication information indicating that image data to be displayed is determined by the second processor; and
the second processor is configured to determine second image data according to the second operation mode and the touch information in response to the third indication information.

6. The electronic device according to claim 1, wherein:
the touch processor comprises a first SPI interface, the display driver comprises a second SPI interface, and the second processor comprises a third SPI interface; and
both the second SPI interface and the third SPI interface are coupled to the first SPI interface.

7. The electronic device according to claim 1, wherein the touch information includes fingerprint information or gesture operation information.

8. A display method of an electronic device, wherein the electronic device comprises a touch processor, a display driver directly coupled to or in direct communication with each other and a second processor, and the display method of the electronic device comprises:
the touch processor generating touch information and sending the touch information to the display driver;
the display driver receiving the touch information and sending first indication information to the touch processor when the electronic device is in a first operation mode, the first indication information indicating that image data to be displayed is determined by the display driver without using the second processor;
the display driver determining first image data according to the first operation mode and the touch information, and driving a display screen to display according to the first image data;
the display driver sending second indication information to the touch processor when the electronic device is in a second operation mode, the second indication information indicating that image data to be displayed is determined by the second processor;
the touch processor sending the touch information to the second processor in response to the second indication information;
the second processor determining second image data according to the second operation mode and the touch information and send the second image data to the display driver; and
the display driver driving the display screen to display according to the second image data.

9. The display method according to claim 8, wherein the display driver has image data of at least one image stored therein; and the display driver determining first image data according to the first operation mode and the touch information comprises:
according to the first operation mode and the touch information, selecting image data of an image from the stored image data as the first image data, or selecting image data of an image from the stored image data and correcting the selected image data by using correction data, to obtain the first image data.

10. The display method according to claim 8, wherein the display driver has image data of at least one image stored therein; and the display driver determining first image data according to the first operation mode and the touch information comprises:
according to the first operation mode and the touch information, selecting image data of an image from the stored image data and correcting the selected image data by using correction data, to obtain the first image data.

11. The display method according to claim 8, wherein the display method of the electronic device further comprises:
the touch processor sending third indication information to the second processor in response to the second indication information, the third indication information indicating that image data to be displayed is determined by the second processor; and
the second processor determining second image data according to the second operation mode and the touch information comprises:
the second processor determining the second image data according to the second operation mode and the touch information in response to the third indication information.

\* \* \* \* \*